United States Patent
Hwang et al.

[11] Patent Number: 5,966,476
[45] Date of Patent: Oct. 12, 1999

[54] SPATIAL SWITCH USING AN OPTICAL BEAM STEERING DEVICE

[75] Inventors: Wol Yon Hwang; Min Cheol Oh; Jang Joo Kim, all of Daejon-shi, Rep. of Korea

[73] Assignee: Electonics and Telecommunications Research Institute, Daejeon, Rep. of Korea

[21] Appl. No.: 08/948,943

[22] Filed: Oct. 10, 1997

[30] Foreign Application Priority Data

Nov. 4, 1996 [KR] Rep. of Korea ................. 96-51777

[51] Int. Cl.[6] ........................................... G02F 1/035
[52] U.S. Cl. ................. 385/3; 385/1; 385/2; 385/16; 385/17; 385/37
[58] Field of Search ................. 385/1, 2, 3, 14, 385/15, 16, 17, 37

[56] References Cited

U.S. PATENT DOCUMENTS

| | | | |
|---|---|---|---|
| 3,990,780 | 11/1976 | Dakss | 385/17 X |
| 4,365,863 | 12/1982 | Broussaud | 385/17 X |
| 4,830,444 | 5/1989 | Cloonan et al. | 385/17 X |
| 4,852,958 | 8/1989 | Okuyama et al. | 385/17 X |
| 4,856,863 | 8/1989 | Sampsell et al. | 385/17 X |
| 5,037,173 | 8/1991 | Sampsell et al. | 385/17 |
| 5,165,104 | 11/1992 | Weverka | 385/7 |
| 5,175,777 | 12/1992 | Bottle | 385/17 |
| 5,255,332 | 10/1993 | Welch et al. | 385/17 |
| 5,303,077 | 4/1994 | Bottle et al. | 385/17 X |

OTHER PUBLICATIONS

A Phased Array Optical Scanning (PHAROS) Device Used as a 1–to–9 Way Switch; John M. Heaton, David R. Wight, John T. Parker, Brian T. Hughes, Jeremy C.H. Birbeck and Keith P. Hilton; Mar. 1992; pp. 678–684; IEEE Journal of Quantum Electronics, vol. 28 No. 3.

Primary Examiner—Brian Healy
Attorney, Agent, or Firm—Antonelli, Terry, Stout & Kraus, LLP

[57] ABSTRACT

A spatial switch of a simple structure using a "M×N" optical beam steering device which operates with M "1×N" spatial switches using a phased optical waveguide array. The spatial switch using an optical beam steering device in accordance with the present invention is characterized in that the optical beam steering device includes an optical waveguide phase modulator array, the optical beam steering device is used as a "1×N" spatial switch device, and M units of the "1×N" spatial switch device are aligned in parallel so that a "M×N" spatial switching operation is performed on a plane where a far field diffraction pattern of the "1×N" spatial switch device is formed. The spatial switch utilizes the characteristics that if the propagation directions of the lights output from "1×N" switches coincide with each other, the far field diffraction patterns formed by the switches converge into the same point.

3 Claims, 2 Drawing Sheets

SPATIAL SWITCH USING AN OPTICAL BEAM STEERING DEVICE

BACKGROUND OF THE INVENTION

1. Field of the Invention

The present invention relates to a spatial switch using an optical beam steering device, and more particularly, to a spatial switch using a "M×N" optical beam steering device which operates with M "1×N" spatial switches using a phased optical waveguide array.

2. Description of the Related Art

According to the conventional technique of manufacturing a spatial switch device in the technical field of integrated optics, the spatial switch device is formed of switching nodes, and passive channel waveguides connecting the switching nodes to input and output ends. The method of connecting the switching nodes to input and output ends varies according to system requirements, and thus various kinds of switching network were implemented in the field of integrated optics. Typical examples of these switching networks will be described hereinbelow.

There has been proposed a 4×4 cross-bar network spatial switch which uses a 2×2 switch of the Δβ reversal directional coupler type at $LiNbO_3$ as a basic switching node (2,2,2 node). In this type of spatial switch, it is difficult to allow a 2×2 switch to have uniform characteristics at all nodes. The number of nodes abruptly increases as the number of input/output channels increase, which results in the increase of a cross-talk and losses. As another type of spatial switch, a 32×32 spatial switch has been implemented based on a polarization independent 8×8 spatial switch of a simplified tree structure.

One of the severe problems encountered with these conventional spatial switches lies in that it is difficult to design the switch device due to the difficulty in manufacturing a switching node, the physical connection among the input, output and switching nodes by a channel waveguide, etc. Further, it is difficult to allow all nodes within a spatial switch to have uniform characteristics. And the number of nodes abruptly increases as the number of input/output channels increase. Also, the number of physical intersections between channel waveguides increases, which results in the increase of a cross-talk between channels and incurs the necessity of increasing the length of spatial the switch device. In accordance therewith, a propagation loss also increases. Lastly, other disadvantages include the complexity of the structure, difficulty of manufacturing, high costs, and low throughput.

SUMMARY OF THE INVENTION

It is therefore an object of the present invention to provide a spatial switch of a simple structure using a "M×N" optical beam steering device which operates with M "1×N" spatial switches using a phased optical waveguide array.

In accordance with one aspect of the present invention to achieve the afore-mentioned object, a spatial switch which uses an optical beam steering device is provided. In the spatial switch in accordance with the present invention, the optical beam steering device includes an optical waveguide phase modulator array; the optical beam steering device is used as a "1×N" spatial switch device; and M units of said "1×N" spatial switch device are aligned in parallel so that a "M×N" spatial switching operation is performed on a plane where a far field diffraction pattern of said "1×N" spatial switch device is formed.

In accordance with the present invention, it is possible to implement a spatial switch of a simple structure wherein a switching node, which is not viable to manufacture, is not used, a switching operation between an input and output is not based on the physical connection by a channel waveguide, and the length of the switch device needs not to be increased despite the increase of the number of input/output channels.

BRIEF DESCRIPTION OF THE DRAWINGS

The present invention will become more apparent upon a detailed description of the preferred embodiments for carrying out the invention as rendered below. In the description to follow, references will be made to the accompanying drawings, where like reference numerals are used to identify like or similar elements in the various drawings and in which.

DETAILED DESCRIPTION OF THE INVENTION

A spatial switch uses an optical beam steering device using a phased optical waveguide array as a basic unit, and takes the structure wherein a plurality of independent optical beam steering devices are aligned in parallel. This optical beam steering device was first implemented by D. R. Wight in 1991. Thereafter, various devices of the same structure but with improved performances were proposed. However, researches directed towards these devices heretofore have been aimed at applications such as a "1×N" spatial switch, laser printer, RF spectrum analyzer or bar-code system. Thus, there has been no structure of the optical beam steering device as disclosed herein with an application to an optical space switching device which can spatially switch a plurality of input channels to a plurality of output channels. The operating principle of an optical beam steering device will now be explained with reference to accompanying drawings.

Figure 1:
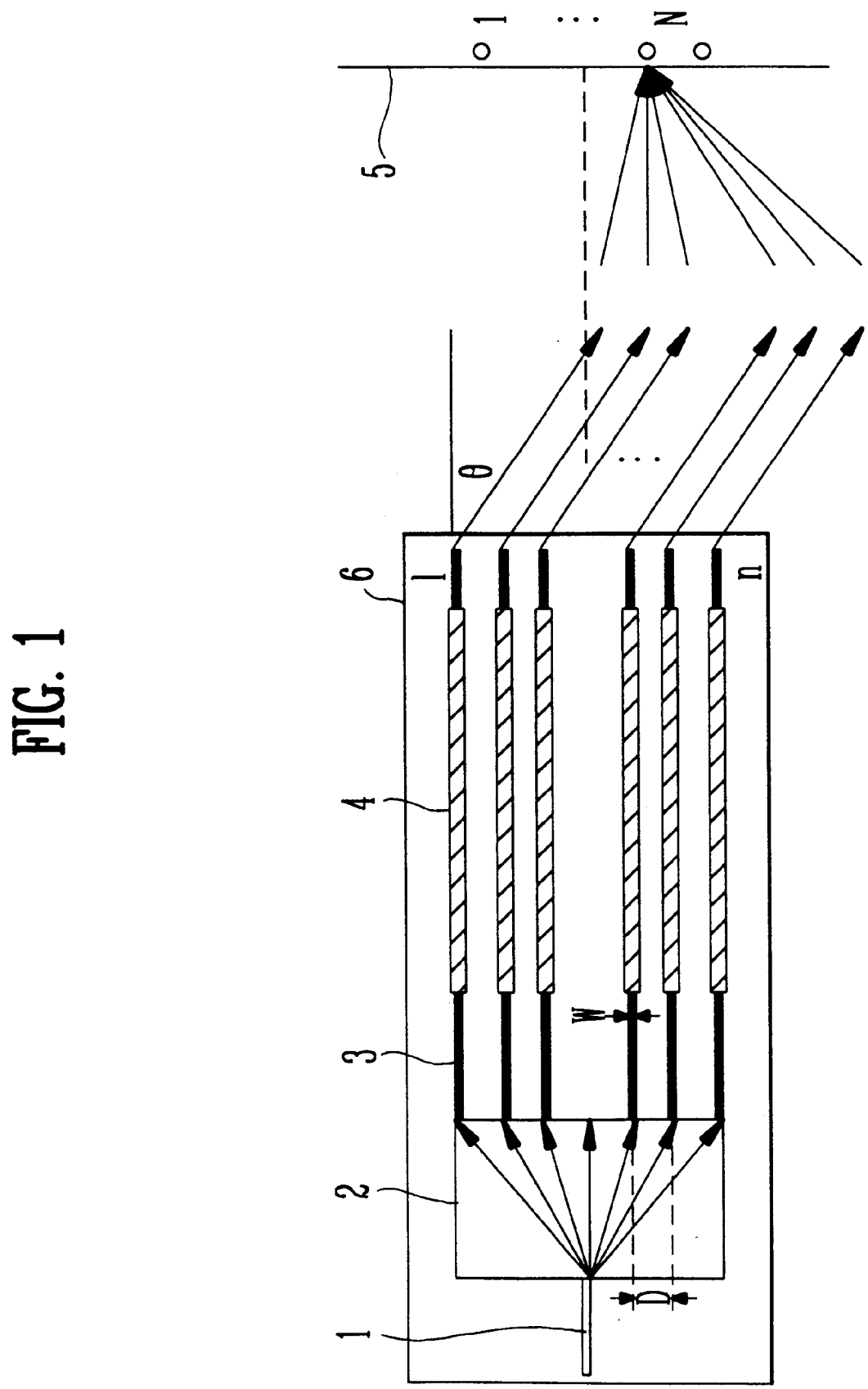
FIG. 1 illustrates a structure of a "1×N" spatial switch using an optical beam steering device which operates with a phased optical waveguide array.

FIG. 1 illustrates a structure of a "1×N" spatial switch using an optical beam steering device which operates with a phased optical waveguide array. In a "1×N" spatial switch 6, the light incident via an input optical waveguide 1 is split and guided into n channel waveguides 3 by a "1×n" power splitter 2, and then propagates through n optically independent phase modulators 4. The lights which passed through phase modulators 4 interact with each other to form a far field diffraction pattern on a plane 5. If the variable δ is defined as a constant increase (or decrease) of a phase between the lights which have passed through adjacent phase modulators, a phase difference of (n−1) δ exists between the lights which have passed through the first and nth phase modulators. Therefore, the diffracted main beam after passing through the phase modulator array are produced at an angle of θ with respect to a central axis.

$$\theta = \sin^{-1}(\delta/kD) \quad (1)$$

where k is a wave vector of the light, and D is the spacing between the wavegude. Thus, if the increase (or decrease) δ of a phase between adjacent waveguides is properly adjusted, the position of the far field diffraction pattern can be arbitrarily adjusted. The number N of output channels which are spatially separated depends on the total number n of phase modulators in the array, the width w of each waveguide, the spacing D between waveguides, etc.

Figure 2:
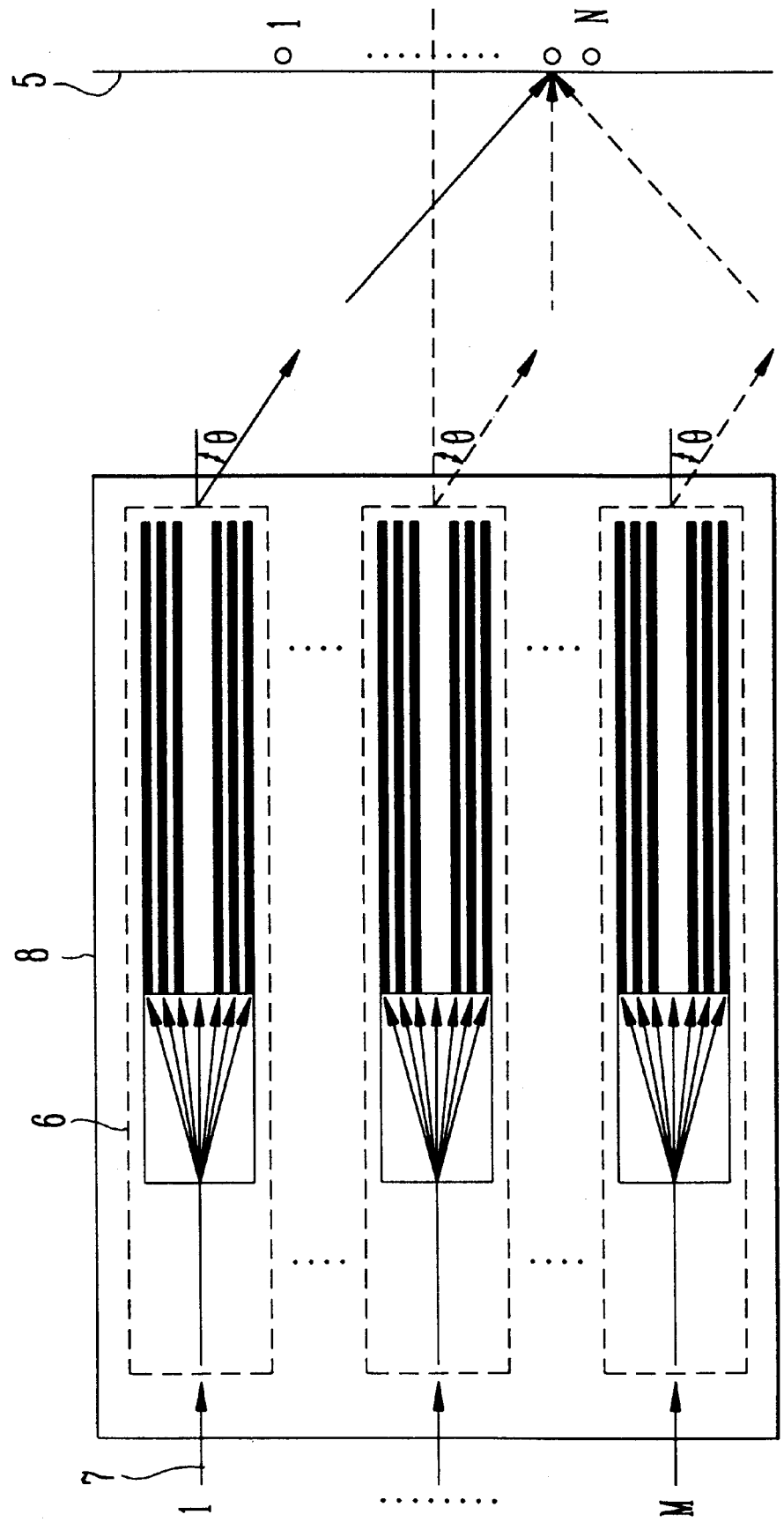
FIG. 2 illustrates a structure of a "M×N" spatial switch which operates with M "1×N" spatial switches in accordance with the present invention.

FIG. 2 illustrates a structure of a "M×N" spatial switch which operates with M "1×N" spatial switches in accordance with the present invention. The operating principle of the "M×N" spatial switch which operates with M "1×N" spatial switches as shown in FIG. 2 will now be described. The entire structure of the "M×N" spatial switch 8 can be formed by arranging M "1×N" switches in parallel. The input lights 1–M incident through optical fibers 7 are output through respective "1×N" switches 6. The special characteristic is utilized that if the directions θ of the wave vectors of the lights output from the "1×N" switches 6 coincide with each other, the far field diffraction patterns formed by the switches converge into the same point. In other words, all M "1×N" switches can be switched to the same N positions on the plane 5 of the far field diffraction pattern, and thus can be used as a "M×N" spatial switch.

The spatial switching operation of the "M×N" spatial switch is achieved by using the characteristics that the lights, which passed through the phase modulator array, are diffracted while propagating through a plane waveguide or free space. Thus, the "M×N" spatial switch can be adopted as a blocking-free spatial switch when an arbitrary input channel is linked to an arbitrary output channel on the plane of the far field diffraction pattern. In contrast to the conventional spatial switches the length of which increases as the number of switching channels increases, the switch device in accordance with the present invention can reduce optical propagation losses due to the increase of the length of the switch device because only the width of the device becomes long.

As mentioned above, the spatial switch in accordance with the present invention uses a "M×N" optical beam steering device which operates with M "1×N" spatial switches using a phased optical waveguide array. Also, the "M×N" spatial switch in accordance with the present invention can serve as a blocking-free spatial switch when an arbitrary input channel is linked to an arbitrary output channel, and can reduce optical propagation losses due to the increase of the length of the switch device because only the width of the device becomes long.

The present invention has been described with reference to a particular embodiment in connection with a particular application. Those having ordinary skill in the art and access to the teachings of the present invention will recognize additional modifications and applications within the scope thereof.

It is therefore intended by the appended claims to cover any and all such applications, modifications, and embodiments within the scope of the present invention.

What is claimed is:

1. A spatial switch which uses an optical beam steering device, wherein said optical beam steering device includes an optical waveguide phase modulator array, said optical beam steering device is used as a "1×N" spatial switch device, and M units of said "1×N" spatial switch device are aligned in parallel so that a "M×N" spatial switching operation is performed on a plane where a far field diffraction pattern of said "1×N" spatial switch device is formed.

2. The spatial switch according to claim 1, wherein the phase modulators in said "M×N" spatial switch operate based on electro-optical effects.

3. The spatial switch according to claim 1, wherein the phase modulators in said "M×N" spatial switch operate based on thermo-optical effects.

* * * * *